(12) United States Patent
Karri et al.

(10) Patent No.: US 12,109,715 B2
(45) Date of Patent: Oct. 8, 2024

(54) COMPUTER CONTROLLED POSITIONING OF DELICATE OBJECTS WITH LOW-CONTACT FORCE INTERACTION USING A ROBOT

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 17/301,296

(22) Filed: Mar. 31, 2021

(65) Prior Publication Data

US 2022/0314453 A1    Oct. 6, 2022

(51) Int. Cl.
*B25J 9/16*      (2006.01)
*B25J 13/08*     (2006.01)

(52) U.S. Cl.
CPC ........... *B25J 9/1697* (2013.01); *B25J 9/1612* (2013.01); *B25J 9/1653* (2013.01); *B25J 13/089* (2013.01)

(58) Field of Classification Search
CPC ...... B25J 9/1697; B25J 9/1612; B25J 9/1653; B25J 13/089; G05B 2219/39523;
(Continued)

(56) References Cited

U.S. PATENT DOCUMENTS 5,831,166 A    11/1998    Kozuka 6,029,519 A  *  2/2000    Kuklinski ............. G01M 10/00
73/570.5

(Continued)

FOREIGN PATENT DOCUMENTS

CN        116802022 A      9/2023
WO     2022207458 A1    10/2022

OTHER PUBLICATIONS

"Method and System for Artificially Creating Gravity less Surroundings during Electronic Device Assemblies", An IP.com Prior Art Database Technical Disclosure, Disclosed Anonymously, IP.com No. IPCOM000252882D, IP.com Electronic Publication Date: Feb. 19, 2018, 5 pages, <https://priorart.ip.com/IPCOM/000252882>.

(Continued)

*Primary Examiner* — Rachid Bendidi
(74) *Attorney, Agent, or Firm* — Michael A. Petrocelli

(57)  ABSTRACT

A computer positions an object using a computer-controlled positioning device. The computer is operatively associated with the positioning device via a control interface. The positioning device has a substantially-hollow interior chamber. The computer identifies a selected object located at a primary location within the interior chamber and having a primary orientation with respect thereto. The computer identifies a first array of elements constructed and arranged to generate contact-free support forces sufficient to maintain the selected object at the primary location. The computer identifies a second array of elements constructed and arranged to provide contact-free interaction forces sufficient to move the selected object within the interior chamber. The computer interacts with the selected object, using the control interface to adjust at least one of either the supporting forces and the interaction forces, to place the selected object into at least one of a secondary location or a secondary orientation.

17 Claims, 13 Drawing Sheets

(58) Field of Classification Search
CPC ........... G05B 2219/39527; G05B 2219/39558; G05B 2219/39567; G05B 2219/40613
See application file for complete search history.

(56) References Cited

U.S. PATENT DOCUMENTS

| | | | | |
|---|---|---|---|---|
| 6,216,538 | B1* | 4/2001 | Yasuda | G10K 15/02 |
| | | | | 73/570.5 |
| 9,911,640 | B2 | 3/2018 | Kesil | |
| 10,210,858 | B2 | 2/2019 | Ochiai | |
| 2017/0289722 | A1* | 10/2017 | Ochiai | H04R 1/403 |
| 2018/0304500 | A1 | 10/2018 | Putkis | |

OTHER PUBLICATIONS

"Rendering Volumetric Haptic Shapes in Mid-Air using Ultrasound", YouTube, Nov. 21, 2014, 1 page, <https://www.youtube.com/watch?app=desktop&v=kaoO5cY1aHk>.

Mell, et al., "The NIST Definition of Cloud Computing", National Institute of Standards and Technology, Special Publication 800-145, Sep. 2011, 7 pages.

Starr, Michelle, "Ultrasound creates a haptic shape that can be seen and felt", CNET, Dec. 2, 2014, 3 pages, <https://www.cnet.com/news/ultrasound-creates-a-haptic-shape-that-can-be-seen-and-felt/>.

Eberhard, Andres, "The Robot That Grips Without Touching", ETH Zürich, Jan. 21, 2020, 3 pages, <https://ethz.ch/en/news-and-events/eth-news/news/2020/01/the-robot-that-grips-without-touching.html>.

Andrade et al., "Contactless pick-and-place of millimetric objects using inverted near-field acoustic levitation", Applied Physics Letters Article, Published online: Feb. 4, 2020, 5 pages.

International Search Report and Written Opinion for International Application No. PCT/EP2022/057800, International Filing Date: Mar. 24, 2022, Mailing Date of Report: Jul. 8, 2022, 13 pages.

Marzo et al., "Holographic acoustic elements for manipulation of levitated objects", Nature Communications Article, Published Oct. 27, 2015, 7 pages.

Matous et al., "Optimization-based Feedback Manipulation Through an Array of Ultrasonic Transducers", arXiv:1902.01328v4, Nov. 12, 2020, 6 pages.

Nakahara et al., "Contact-less Manipulation of Millimeter-scale Objects via Ultrasonic Levitation", 2020 8th IEEE International Conference on Biomedical Robotics and Biomechatronics (BioRob), New York, Nov. 29-Dec. 1, 2020, 8 pages.

\* cited by examiner

FIG. 2 – traditional system figure | include nouns from claims

COMPUTER CONTROLLED POSITIONING OF DELICATE OBJECTS WITH LOW-CONTACT FORCE INTERACTION USING A ROBOT

BACKGROUND

The present invention relates generally to the field of robotics, and more specifically, to positioning selected objects using a computer-controlled positioning device.

Computer-controlled, robotic positioning devices allow for interaction with objects. These devices allow controlled movement and precise locating of objects. Modern positioning devices can grip and move heavy loads quickly. Unfortunately, the forces needed to grip heavy loads firmly can impart damaging forces to the objects being engaged. Some objects, such as delicate electronics and other fragile components, may be damaged if engaged with too much pressure. Severe component damage can occur when these components are not handled appropriately.

SUMMARY

According to one embodiment, a computer-implemented method of positioning an object using a computer-controlled positioning device includes identifying a computer and a positioning device operatively associated with the computer via a control interface, the positioning device having a substantially-hollow interior chamber. The computer identifies a selected object located at a primary location within the interior chamber and having a primary orientation with respect to the chamber. The computer identifies a first array of elements constructed and arranged to generate contact-free support forces sufficient to maintain the selected object at the primary location. The computer identifies a second array of elements constructed and arranged to provide contact-free interaction forces sufficient to move said selected object within the interior chamber. The computer interacts with the object, via the control interface, to adjust at least one of either the supporting forces and the interaction forces to place the selected object into at least one of a secondary location or a secondary orientation. According to aspects of the invention, the computer identifies a movable sleeve having a sleeve interior chamber substantially coaxial with said positioning device interior chamber. The computer moves via said control interface, the sleeve into an extended position with respect to the positioning device interior chamber. The at least one of a secondary location or a secondary orientation is within the sleeve interior chamber. According to aspects of the invention, the computer identifies a camera associated with the interior chamber, and the camera is adapted and arranged to identify a current location of the selected object relative to at least one positioning reference. The interacting with the selected object, is conducted at least in part, with reference to signals sent by said camera. According to aspects of the invention, the support forces are selected from a list consisting of acoustic radiation forces and magnetic forces. According to aspects of the invention, at least one of the force generation elements is independently controlled, and the adjustment of the at least one of the supporting forces and interaction forces is based, at least partially on the independent control. According to aspects of the invention, the computer identifies the positioning device as a sending positioning device and identifying a second positioning device substantially identical to said sending position device as a receiving positioning device; and the at least one secondary location or secondary orientation is within the second positioning device. According to aspects of the invention, the computer identifies the selected object as an object for which the computer has a stored group of associated interactions; and wherein the least one of a secondary location or a secondary orientation is identified within the stored group of interactions.

According to another embodiment a system of positioning an object using a computer-controlled positioning device, which comprises: a computer system comprising a computer readable storage medium having program instructions embodied therewith, the program instructions executable by a computer to cause the computer to: identify a computer and a positioning device operatively associated with said computer via a control interface, said positioning device having a substantially-hollow interior chamber; identify a selected object located at a primary location within said interior chamber and having a primary orientation with respect thereto; identify a first array of elements constructed and arranged to generate contact-free support forces sufficient to maintain the selected object at said primary location; identify a second array of elements constructed and arranged to provide contact-free interaction forces sufficient to move said selected object within said interior chamber; and interact with said object, by said computer using said interface, to adjust at least one of either said supporting forces and said interaction forces to place said selected object into at least one of a secondary location or a secondary orientation.

According to another embodiment, a computer program product to position an object within an environment using a computer-controlled positioning device, the computer program product comprising a computer readable storage medium having program instructions embodied therewith, the program instructions executable by a computer to cause the computer to: identify a computer and a positioning device operatively associated with said computer via a control interface, said positioning device having a substantially-hollow interior chamber; identify, using said computer, a selected object located at a primary location within said interior chamber and having a primary orientation with respect thereto; identify, using said computer, a first array of elements constructed and arranged to generate contact-free support forces sufficient to maintain the selected object at said primary location; identify, using said computer, a second array of elements constructed and arranged to provide contact-free interaction forces sufficient to move said selected object within said interior chamber; and interact, using said computer, with said object, by said computer using said interface, to adjust at least one of either said supporting forces and said interaction forces to place said selected object into at least one of a secondary location or a secondary orientation.

The present disclosure recognizes and addresses the shortcomings and problems associated with gripping delicate objects with computer-controlled devices.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
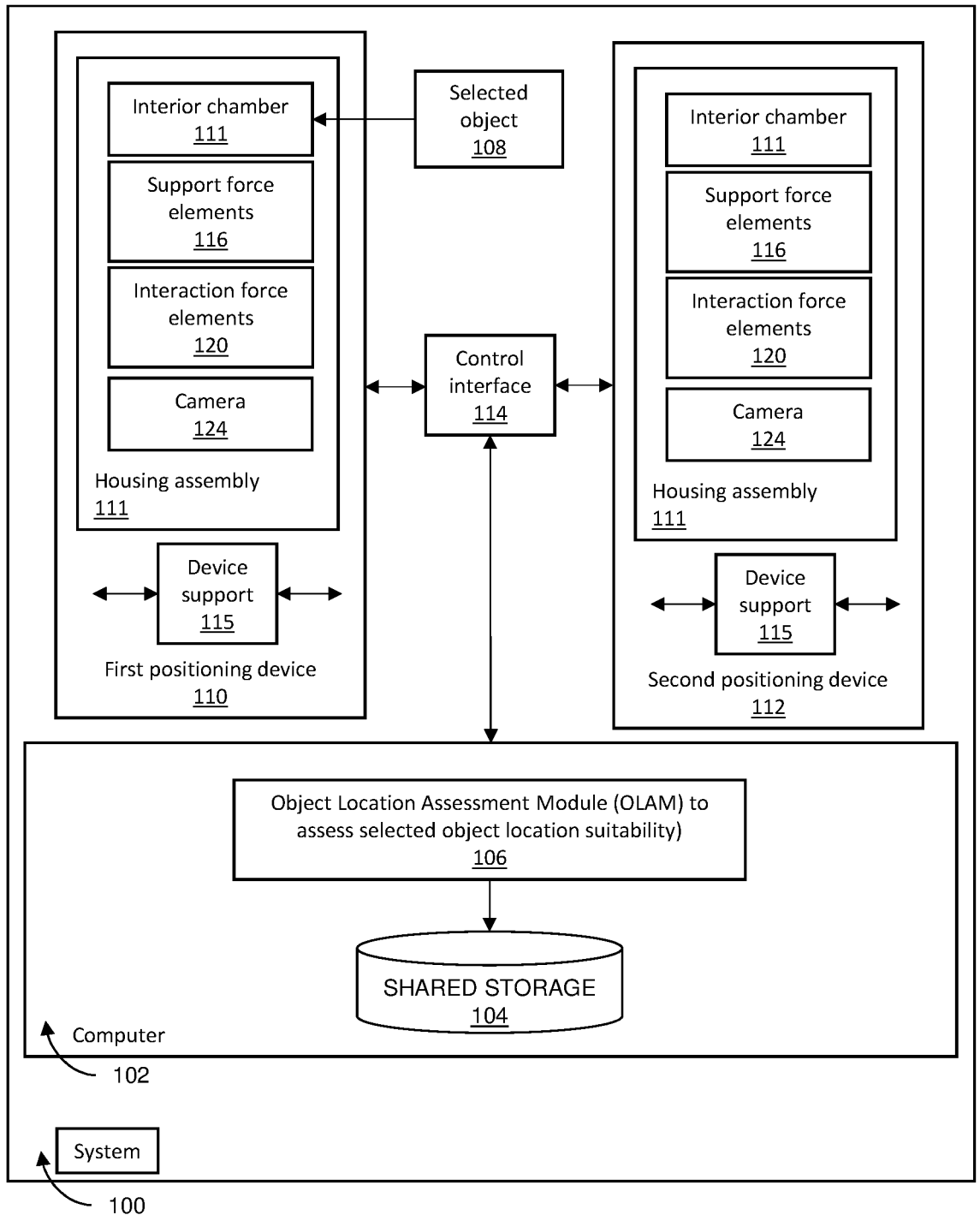
FIG. 1 is a schematic block diagram illustrating an overview of a system for computer-implemented optimization of input component activation in a teleconference according to embodiments of the present invention.
Figure 2:
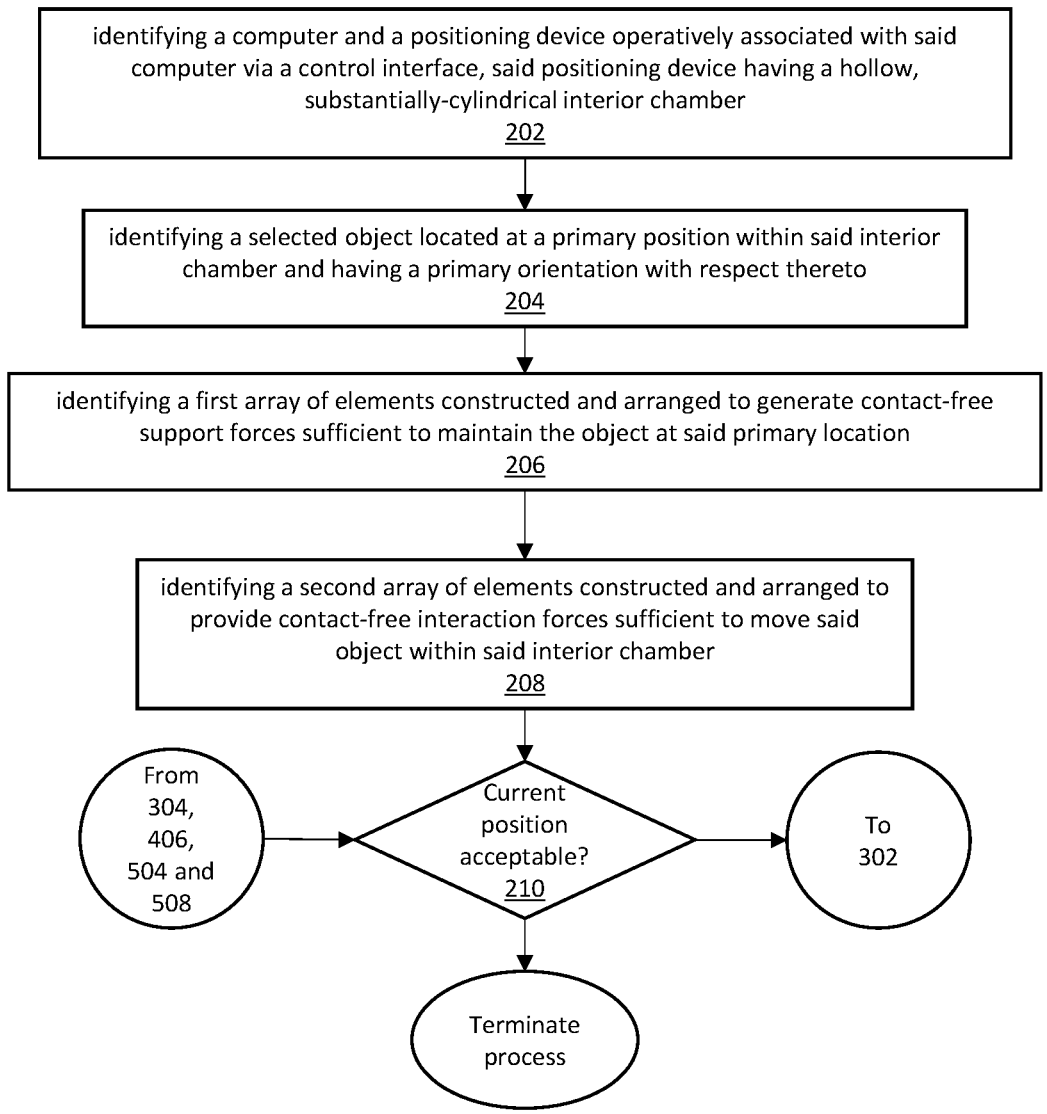
FIG. 2 is a flowchart illustrating aspects of a method, implemented using the system shown in FIG. 1, of a method to position an object using a computer-controlled, low-contact-force-generating positioning device according to aspects of the invention.
Figure 3:
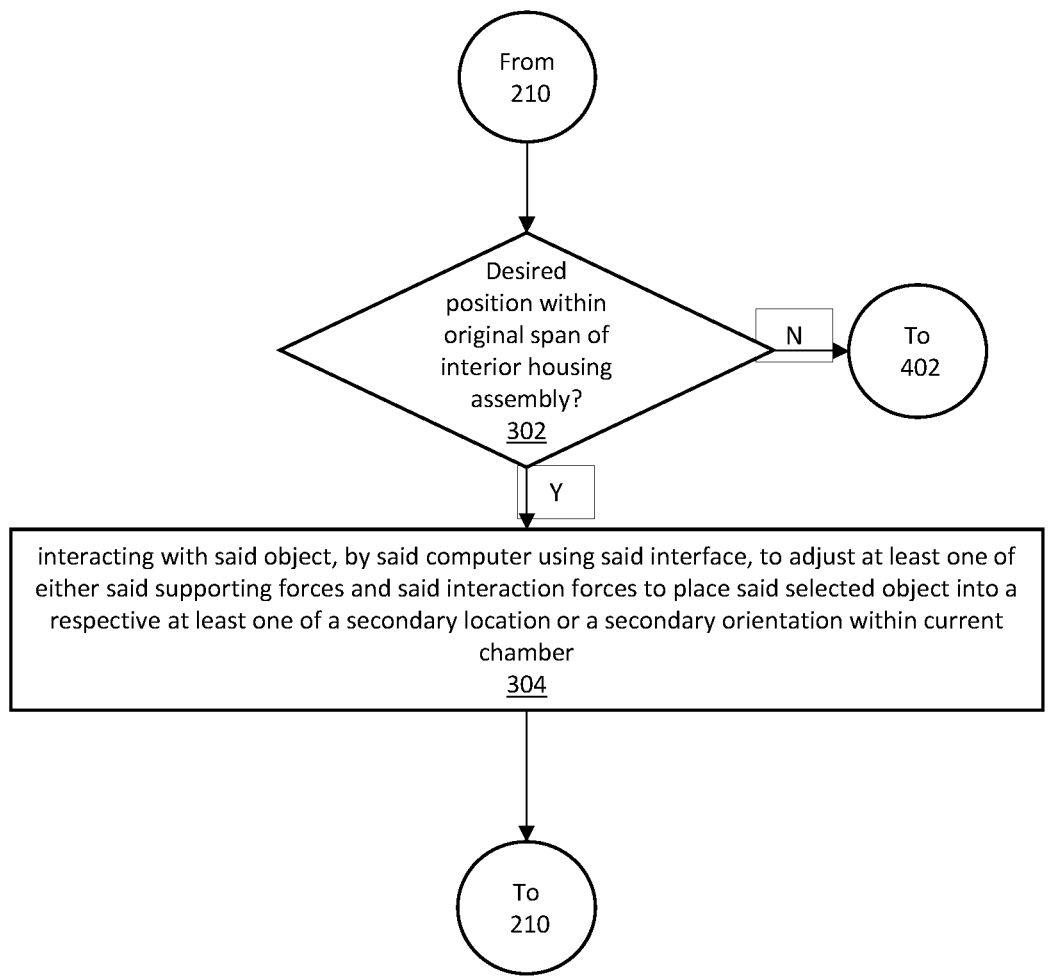
FIG. 3 is a flowchart illustrating aspects of a method, implemented using the system shown in FIG. 1, of a method to position an object using a computer-controlled, low-contact-force-generating positioning device according to aspects of the invention.
Figure 4:
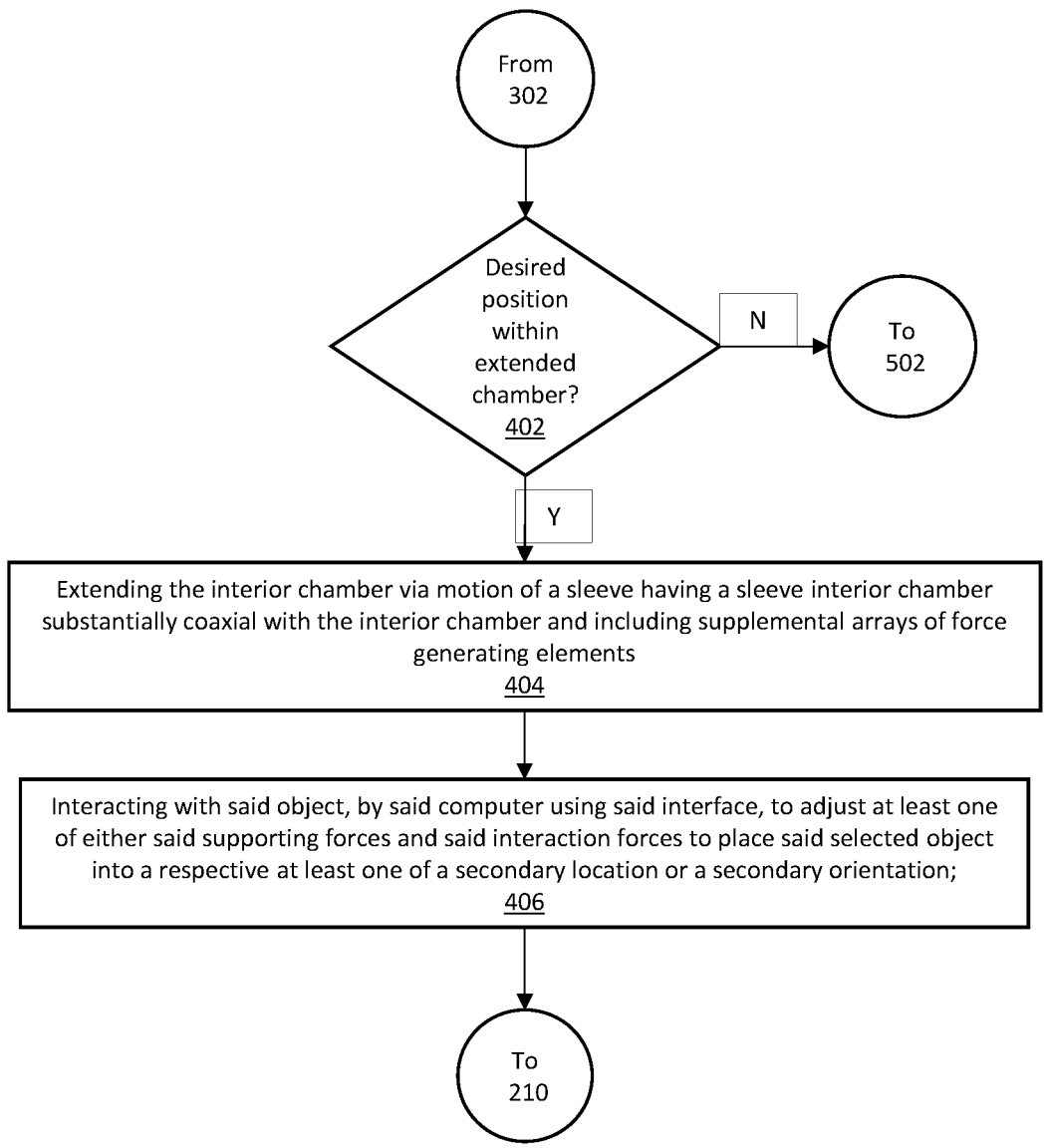
FIG. 4 is a flowchart illustrating additional aspects of a method, implemented using the system shown in FIG. 1, of a method to position an object using a computer-controlled, low-contact-force-generating positioning device according to aspects of the invention.
Figure 5:
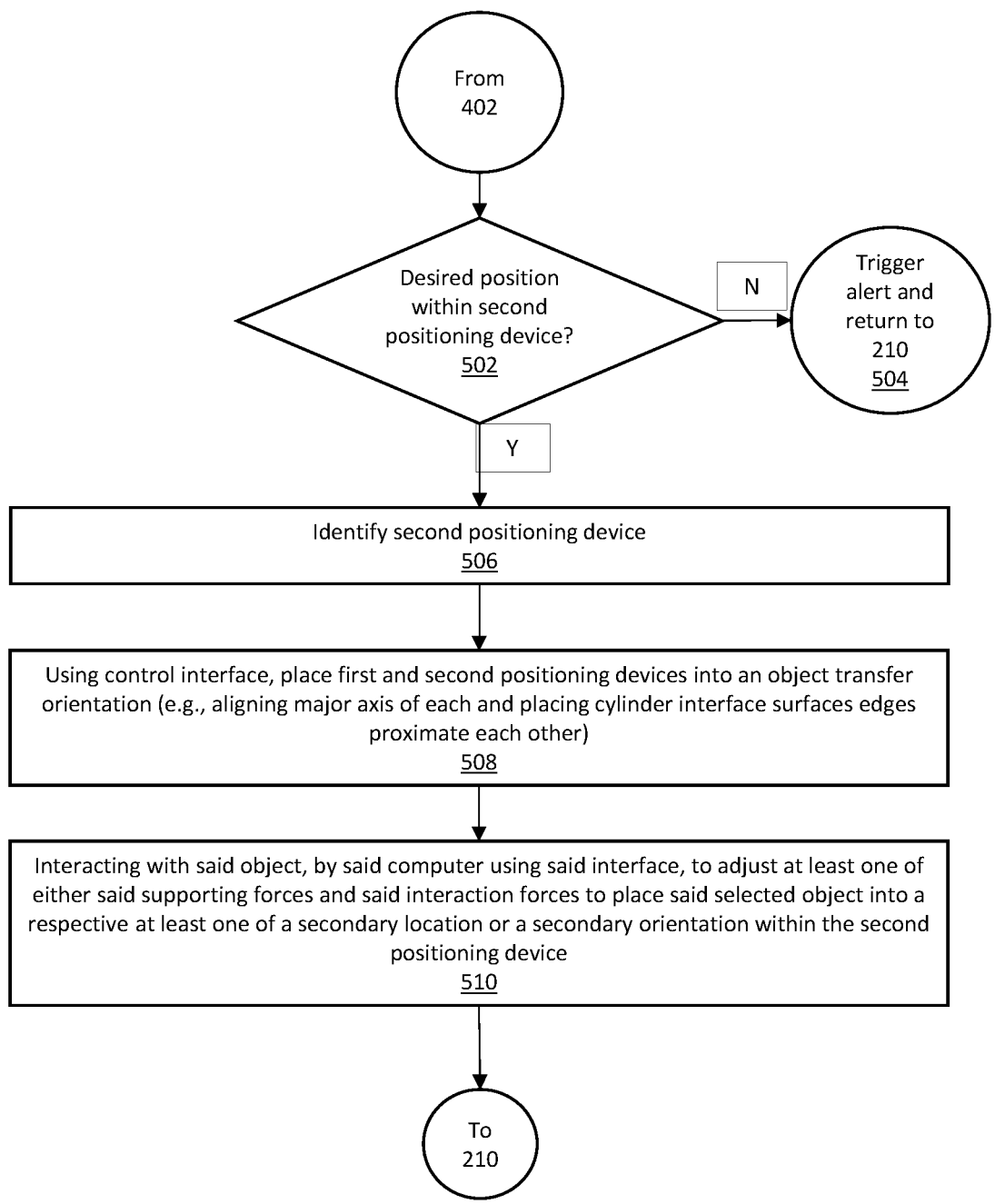
FIG. 5 is a flowchart illustrating additional aspects of a method, implemented using the system shown in FIG. 1, of a method to position an object using a computer-controlled, low-contact-force-generating positioning device according to aspects of the invention.

Now with combined reference to the Figures generally and with particular reference to FIG. 1 and FIG. 2, an overview of a method of positioning an object using a computer-controlled, low-contact-force-generating positioning device usable within a system 100 as carried out by a server computer 102 having optionally shared storage 104. The server computer 102 includes object location assessment module (OLAM) 106 that determines the suitability of a current location for a selected object 108. As will be more fully discussed below, the server computer 102 is in operative control with one or more positioning devices 110, 112 via control interface 114 and, based on information from the OLAM 106, determines whether the selected object 108 is in a desired position and directs components within the system 100 accordingly.

Figure 6:
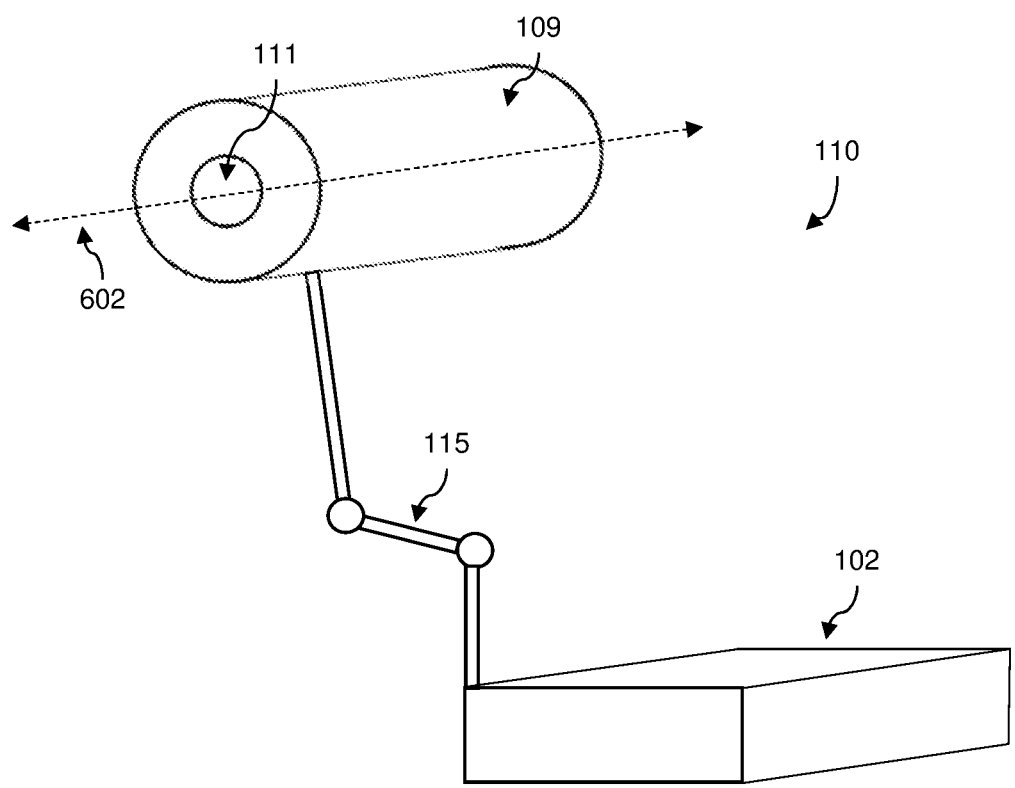
FIG. 6 is an isometric view of portions of a positioning device used in a method to position an object using a computer-controlled, low-contact-force-generating positioning device according to aspects of the invention.
Figure 7A:
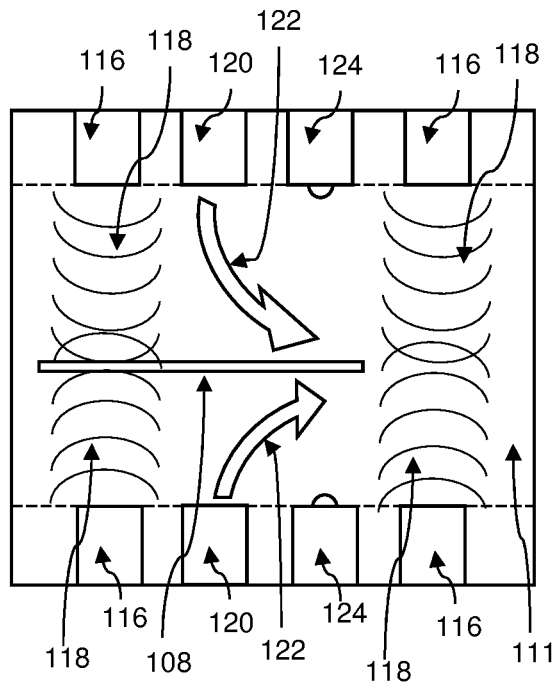
FIG. 7A is a partial side view of the positioning device shown in FIG. 6, schematically showing an interior chamber and elements supporting, monitoring, and interacting with a selected object in a primary location according to aspects of the invention.
Figure 7B:
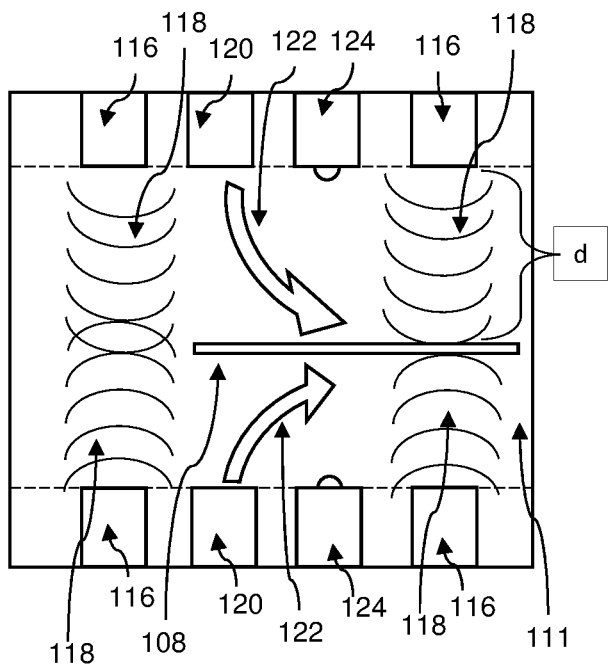
FIG. 7B is a partial side view of the positioning device shown in FIG. 6, schematically showing an interior chamber and elements supporting, monitoring, and interacting with a selected object in a secondary location according to aspects of the invention.

Each of the positioning devices 110, 112 includes components that will engage a selected object 108 in a generally touch-free manner, with a minimal amount of contact within the interior chamber 111 of an elongated housing assembly 109. In particular, the positioning devices 110, 112 each includes an array of support force elements 116 that collectively generate contact-free support forces 118 capable of supporting selected objects 108 placed within interior chamber 111 of a positioning device 110, (e.g., as shown in FIG. 6). The support force elements 116 are grouped into cooperative arrays arranged around the interior chamber 111 (e.g., as shown in FIGS. 7A and 7B). According to aspects of the invention, the support force elements 116 are wave sources (e.g., ultrasonic transducer, etc.) that generate high-frequency (e.g., above 25 kHz) waves. The support force elements 116 are arranged such that the waves 118 generated will constructively interfere to produce standing waves characterized by high and low pressure zones capable of supporting lightweight objects (e.g., below approximately 200 mg) having a volume below approximately 10 cubic millimeters and a weight typically in the range of 1-25 milligrams. According to aspects of the invention, the selected object is expected to be a relatively-small electronic component or other similar fragile element, such as computer circuitry, etc.

Aspects of the positioning devices 110, 112 will engage the selected object 108 with a minimal amount of force, thereby ensuring safe, damage-free object handling. When these forces 118 are applied uniformly, the selected object 108 will, without other intervening forces (such as those 122 from the interaction force elements 120), tend to stay in one location within the interior chamber 111. According to aspects of the invention, selected objects 108 may be supported within fixed high-pressure nodes located in the standing waves of the contact-free support forces 118. According aspects of the invention, the support force elements 116 and interaction force generation elements 120 are located within a positioning device housing assembly 109, proximate and typically at-least-partially surrounding housing assembly interior chamber 111. According to aspects of the invention, the server computer 102, using information stored (or present in a source available to the server computer) about the selected object 108, will estimate the selected object weight. In an embodiment, the server computer 102 will calculate, as is known by those skilled in this field, an acoustic radiation force (also known as an acoustic levitation force) appropriate for the selected object 108 and will direct the support force elements 116 to generate support forces 118 accordingly. According to aspects of the invention, these acoustic standing waves are sufficient to maintain the selected object 108 a desired distance (e.g., for example, radial distance "d" shown in FIG. 7B) from the support force elements 116. According to aspects of the invention, the server computer 102 may selectively adjust intensity the forces 118 generated within the array of support force elements 116 to strategically impart motion to the selected object 108. In some embodiments, the positioning devices 110, 112 are robotic arms mounted on dynamically-articulated device supports 115 controlled by the server computer 102 via control interface 114. According to aspects of the invention, the server computer 102 may control the various components of the positioning device through the control interface 114 (e.g., a control panel) and the device supports 115.

It is noted that in some embodiments, the support force elements 116 generate cooperative magnetic forces suitable to support objects of appropriate materials (e.g., ferromagnetic materials or other known materials that respond to magnetic forces selected by one skilled in this field). In an embodiment, the support force elements 116 are magnetic generate substantially-attractive magnetic forces. In other embodiments, the support force elements 116 generate substantially-repulsive known magnetic forces. According to aspects of the invention, one or more hall effect sensor (not shown) may be used to regulate the magnetic forces generated (e.g., contact-free support forces 118), to maintain the selected object 108 in a desired distance (e.g., for example, radial distance "d" shown in FIG. 7B) from the support force elements 116.

According to aspects of the invention, the positioning devices 110, 112 include cameras 124 arranged to monitor the housing assembly interior chamber 602, allowing the server computer to determine a current position of the selected object 108. According to aspects of the invention, the interior chamber 111, 130, 1002 includes reference indicia (not shown) to aid in determining the locating of the selected object 108. The server computer 102 sends reference images (e.g., multiple still images or video) to the OLAM for processing and identification of selected object location as part of moving the selected object from a primary position into a secondary position as desired (e.g., to move the selected object from the primary position shown FIG. 7A into the secondary position shown in FIG. 7B or to move the selected object from the primary orientation shown FIG. 8A into the secondary orientation shown in FIG. 8B).

According to aspects of the invention, the positioning devices 110, 112 include interaction force generation elements 120 that cooperatively generate object moving forces 122 sufficient to change the position of the selected object 108. In particular, the object moving forces 122 are sufficient to shift selected object 108 location (e.g., axial translation along major axis 604 of the interior chamber 111 shown collectively in FIG. 7A and FIG. 7B), selected object orientation (such as spinning about the major axis 602 of the interior chamber 111), and combinations of both. The server computer 102 can accomplish other changes in selected object position by directing the interaction force generation elements 120 as appropriate to move the selected object 108 into desired locations and orientations.

According to aspects of the invention the interaction force generation elements 120 are nozzles that produce jets (or similar controlled flow) of fluid (e.g., such as air or other fluid selected to be suitable for interaction with the selected objects 108) that propel and move the selected object from a primary location or orientation into a respective secondary location or orientation. The interaction force generation elements 120 are in fluid communication with a fluid source (not shown) to provide the fluid as directed by the server computer 102 to direct the selected object 108 into a desired second position, based on input from the OLAM 106. Is noted that the server computer 102 can also cause the support force generation elements 116 to generate contact-free support forces 118 that can guide the selected object from one position to another. According to aspects of the invention, each of the support force generation elements 116 and interaction force generation elements 120 is separately identified, and each of the various elements can be controlled and activated individually to selectively impart motion to the selected object 108. It is noted that variations of magnetic or ultrasound forces can be created along to move the selected object from a first or primary position into a secondary position. In particular, the support force elements 116 may generate individually-adjusted haptic or magnetic forces (e.g., forces that vary along the major axis 602 of the interior chamber 111) to urge the selected object 108 into various locations and orientations.

Now with specifically to FIG. 2, and to other figures generally, a method of positioning an object using a computer-controlled, low-contact-force-generating positioning device according to aspects of the invention will be described. The server computer 102 at block 202 identifies a positioning device 110 operatively associated with the server computer via a control interface 114; the positioning device has a hollow, substantially-cylindrical interior chamber 111.

The server computer 102, at block 204 identifies, via Object Location Assessment Module (OLAM) 106 and camera 124, identifies a selected object 108 located at a primary position within the interior chamber; the selected object 108 has a primary orientation with respect to the interior chamber 111, and this position is tracked by camera 124.

Figure 8A:
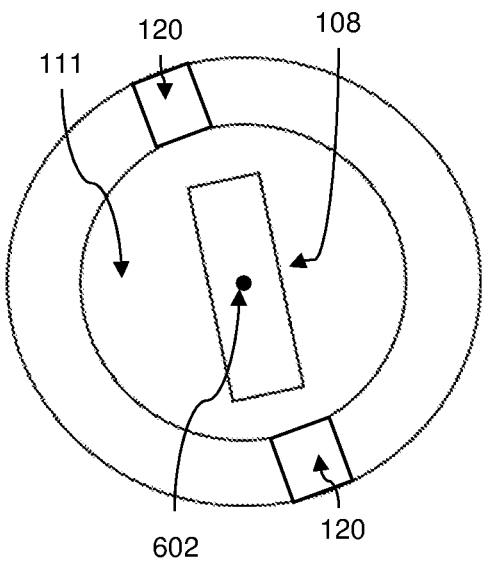
FIG. 8A is a partial end view of the positioning device shown in FIG. 6, schematically showing an interior chamber and a selected object in a primary orientation according to aspects of the invention.

The server computer 102, identifies at block 206 a first array of elements (e.g., support force generation elements 116) constructed and arranged to generate contact-free support forces 118 sufficient to maintain the selected object 108 at a primary position characterized by a primary location and a primary orientation (e.g., as seen in FIG. 7A and FIG. 8A, respectively). According to aspects of the invention, the support force generation elements 116 produce uniform forces that hold (and selectively adjust) the selected object 108 in a desired location and orientation, as directed by the server computer 102 via control interface 114.

Figure 8B:
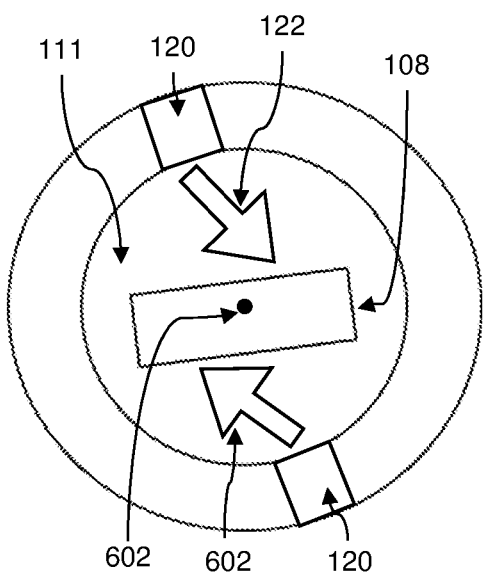
FIG. 8B is a partial end view of the positioning device shown in FIG. 6, schematically showing an interior chamber and elements causing the selected object to move into a secondary orientation according to aspects of the invention.

The server computer 102, identifies at block 208 a second array of elements (e.g., interaction force generation elements 120) constructed and arranged to generate contact-free object moving forces sufficient to move the selected object 108 from a primary position characterized by a primary location and a primary orientation (e.g., as seen in FIG. 7A and FIG. 8A, respectively) into a secondary position characterized by a secondary location and a secondary orientation (e.g., as seen in FIG. 7B and FIG. 8B, respectively). According to aspects of the invention, the support force generation elements 116 cooperatively produce uniform forces that hold (and selectively adjust) the selected object 108 in a desired location and orientation, as directed by the server computer 102 via control interface 114.

The server computer 102, via OLAM 106 and cameras 124 at block 210, determines whether the selected object 108 is in a desired location. According to aspects of the invention, the desired location may be provided by a user via control interface 114, and if the selected object is in a desired location, no further action is taken until a new desired location is indicated through the control interface. If, however, the current position of the selected object 108 is not acceptable or desired, control is forwarded to block 302. According to aspects of the invention, secondary locations can be located within the positioning device 110, may be on remote work surfaces, and may even by associated with a second positioning device 112.

Figure 10:
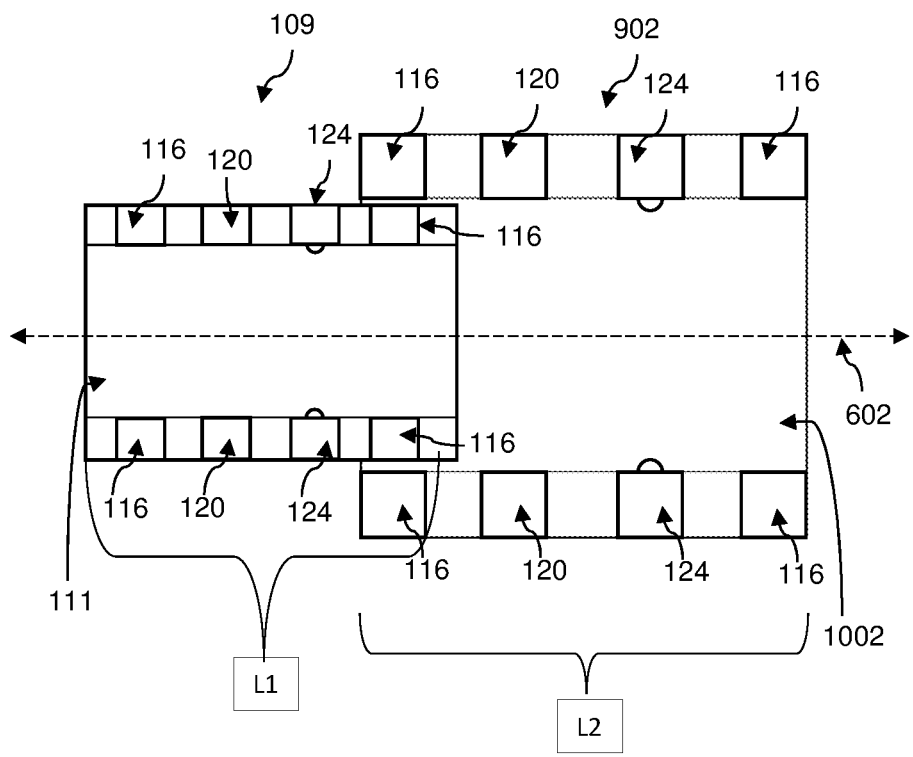
FIG. 10 is a partial side view of the positioning device shown in FIG. 9, schematically showing an interior chamber and a selected object in a secondary location according to aspects of the invention.

If the server computer 102 has determined that the selected object 108 is not in a desired location, the server computer determines at block 302, via control interface 114, whether the desired location for the selected object is within the span of housing assembly 109 (e.g., as indicated by reference "L1" in FIG. 10. If the server computer 102 determines that the desired position of the selected object 108 is within the span L1 of housing assembly 109, then the server computer, via control interface 114 at block 304, interacts with the selected object 108, via the control interface 114, to adjust at least one of either the contact-free support forces 118, the interaction forces (e.g., object moving forces 122), or a combination of both, to place the selected object into a respective secondary location, secondary orientation, or both, within the interior chamber 111 of housing assembly 109. In particular, the server computer 102 directs the interaction force generation elements 120 to exert object moving forces 122 sufficient to urge the selected object 108 into a new location, new orientation, or a combination of both. According to aspects of the invention, the object moving forces 122 can be directed substantially along the interior chamber major axis 602 (e.g., to translate the selected object to a secondary location within the interior chamber 111 of housing assembly 109, as shown collectively in FIGS. 7A and 7B), substantially-circumferential about the interior chamber major axis (e.g., to spin the selected object into a secondary orientation within the interior chamber 111 of housing assembly 109, as shown collectively in FIGS. 8A and 8B), or some combination (e.g., to provide other locations or orientations as appropriate). According to some aspects of the invention, the server computer 102 may direct the support force generation elements 116 to modulate the contact-free support forces 118 to provide supplemental motion control of the selected object 108. The server computer 102 monitors images from cameras 124 and directs the interaction force generation elements 120 (and, selectively, the support force generation elements 116) to hold the selected object 108 in place once in the desired secondary position (e.g., as shown in FIGS. 7B and 8B), and control returns to block 210 for further location assessment.

If the server computer 102 determines that the desired position of the selected object 108 is not within the span L1 of housing assembly 109, the server computer 102 determines, via OLAM 106 at block 402, whether the desired position for the selected object 108 is within an extended interior chamber 1002 associated with positioning device 110. In particular, the server computer determines whether the desired location for the selected object is within the span L2 of an exterior sleeve 902 arranged outside of, and aligned co-axially with, housing assembly 109. If appropriate, based on input from the OLAM 106, the server computer 102 via control interface 114, at block 404, slides the exterior sleeve 902 along the outside of housing assembly 109, along major axis 602. In an embodiment, the exterior sleeve 902 includes supplemental arrays of support force generation elements 116, interaction force generation elements 120, cameras 124, etc. as are found in housing assembly 109, so that the server computer can use the exterior sleeve to use the selected object supporting, re-positioning, and position monitoring capabilities of housing assembly 109 in span L2 of an interior chamber 1002 of the exterior sleeve 902 (e.g., as shown in FIG. 10).

Once the server computer 102 has determined that the desired position of the selected object 108 is within the span L2 of housing assembly 902 and the exterior sleeve 902 has been extended, then the server computer 102, via control interface 114 at block 406, interacts with the selected object 108 by adjusting at least one of either the contact-free support forces 118, the interaction forces (e.g., object moving forces 122), or a combination of both, to place the selected object into a respective secondary location, secondary orientation, or both, within the interior chamber 1002 of housing assembly 902. In particular, the server computer 102 directs the interaction force generation elements 120 to exert object moving forces 122 sufficient to urge the selected object 108 into a new location, new orientation, or a combination of both within the interior chamber 1002. According to aspects of the invention, the object moving forces 122 can be directed substantially along the interior chamber major axis 602 (e.g., to translate the selected object to a secondary location within the interior chamber 1002 of housing assembly 902), substantially-circumferential about the interior chamber major axis (e.g., to spin the selected object into a secondary orientation within the interior chamber 1002 of housing assembly 902), or some combination (e.g., to provide other locations or orientations as appropriate). According to some aspects of the invention, the server computer 102 may direct the support force generation elements 116 to modulate the contact-free support forces 118 to provide supplemental motion control of the selected object 108. The server computer 102 monitors images from cameras 124 and directs the interaction force generation elements 120 (and, selectively, the support force generation elements 116) to hold the selected object 108 in place once in the desired secondary position, and control returns to block 210 for further location assessment.

Figure 11:
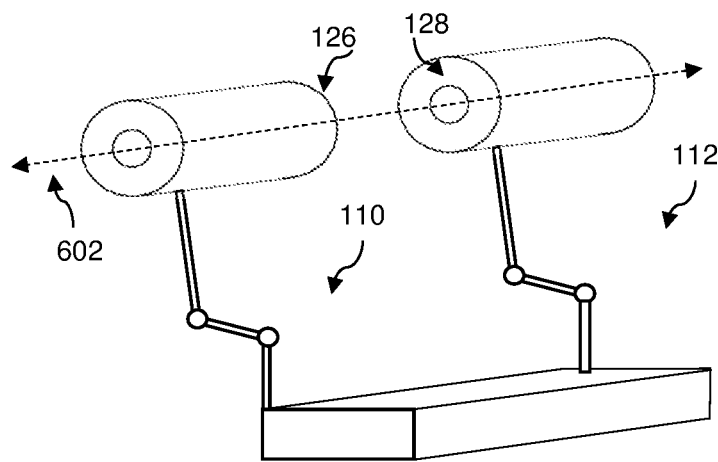
FIG. 11 is an isometric view of portions of two positioning device used cooperatively in a method to position an object using a computer-controlled, low-contact-force-generating positioning device according to aspects of the invention.
Figure 12:
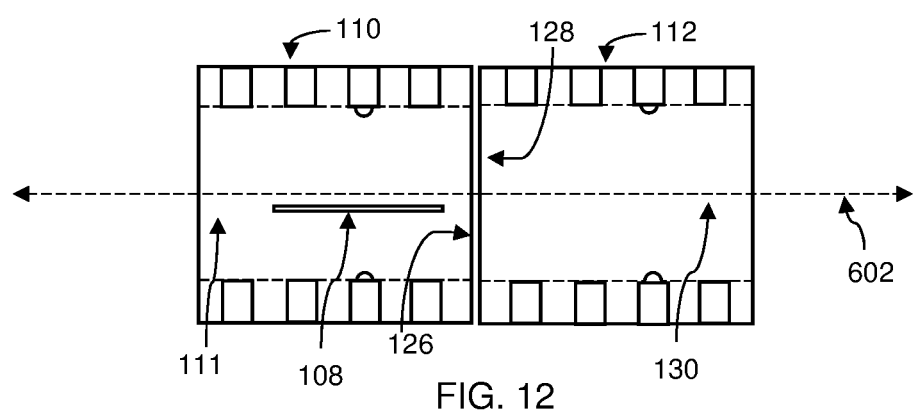
FIG. 12 is a partial side view schematically showing interior chambers of the positioning devices shown in FIG. 11 in an object transfer orientation and a selected object in a primary location according to aspects of the invention.
Figure 13:
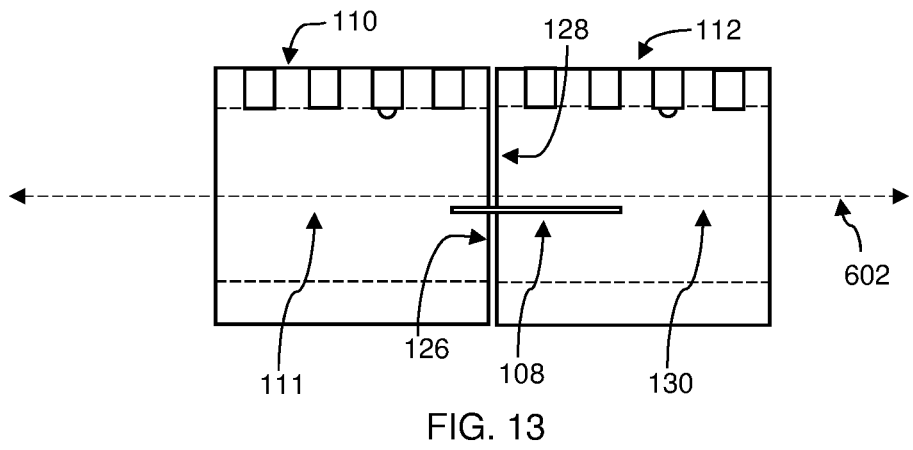
FIG. 13 is a partial side view schematically showing interior chambers of the positioning devices shown in FIG. 12, in an object transfer orientation and a selected object in a secondary location, partially transferred between the positioning devices according to aspects of the invention.

According to aspects of the invention, the desired location for the selected object 108 may be beyond the span L1 of the interior chamber 111 of housing assembly 109 and beyond the span L2 of the interior chamber 1002 of extendable sleeve 902. In such cases, the server computer 102 may make, via OLAM 106 at block 502, a determination to transfer the selected object 108 from a first positioning device 110 to a second positioning device 112 and identifies an appropriate second positioning device 112 (e.g., as shown in FIG. 11). The server computer 102, via control interface 114 at block 508, places the first and second positioning devices 110, 112 into an object transfer orientation (e.g., aligning major axis of each and placing cylinder interface surfaces edges 126, 128 proximate each other) as shown in FIG. 12. It is noted that according to aspects of the invention, the second positioning unit 112 is substantially a duplicate of positioning device 110 and both positioning devices have comparable element arrays 116, 120, cameras 124, and so forth. The server computer 102 at block 510 interacts with the selected object, using control interface 114 to adjust at least one of either said supporting forces and said interaction forces to place said selected object into at least one of a secondary location or a secondary orientation within the second positioning device 112 (as shown collectively in FIG. 12 and FIG. 13. According to aspects of the invention, transferring the selected object between positioning devices 110, 112 is accomplished with negligible, if any physical touch. It is noted that transferring the selected object 108 between positioning devices 110, 112 is especially useful in assembly settings, where a selected object 108 may undergo a series of processing interactions during fabrication, component finishing, etc. According to aspects of the invention, groups of activities may be associated with given selected objects 108, and automated interaction among those objects, the positioning devices 110, 112, and individual positioning device elements (e.g., support force generation elements 116, interaction force generation elements 120, cameras 124, and so forth) may be stored by the server computer. These automated interaction steps may be automatically executed, when the identity (e.g., automatically via image recognition with said camera 124, by direct identification through the control interface 114, or other method selected by one skilled in this field) of a selected device 108 matches the identity of a device having a stored group of interactions. This stored interaction arrangement is helpful during repetitive tasks and increases operational efficiency for the system 100, minimizing user interaction and oversight.

According to aspects of the invention, if the desired secondary location is beyond the housing assembly 109, beyond the extendable exterior sleeve 902, and not within a second positioning device 112, the server computer 102 triggers and alarm at block 504 and control returns to block 210 for further processing.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
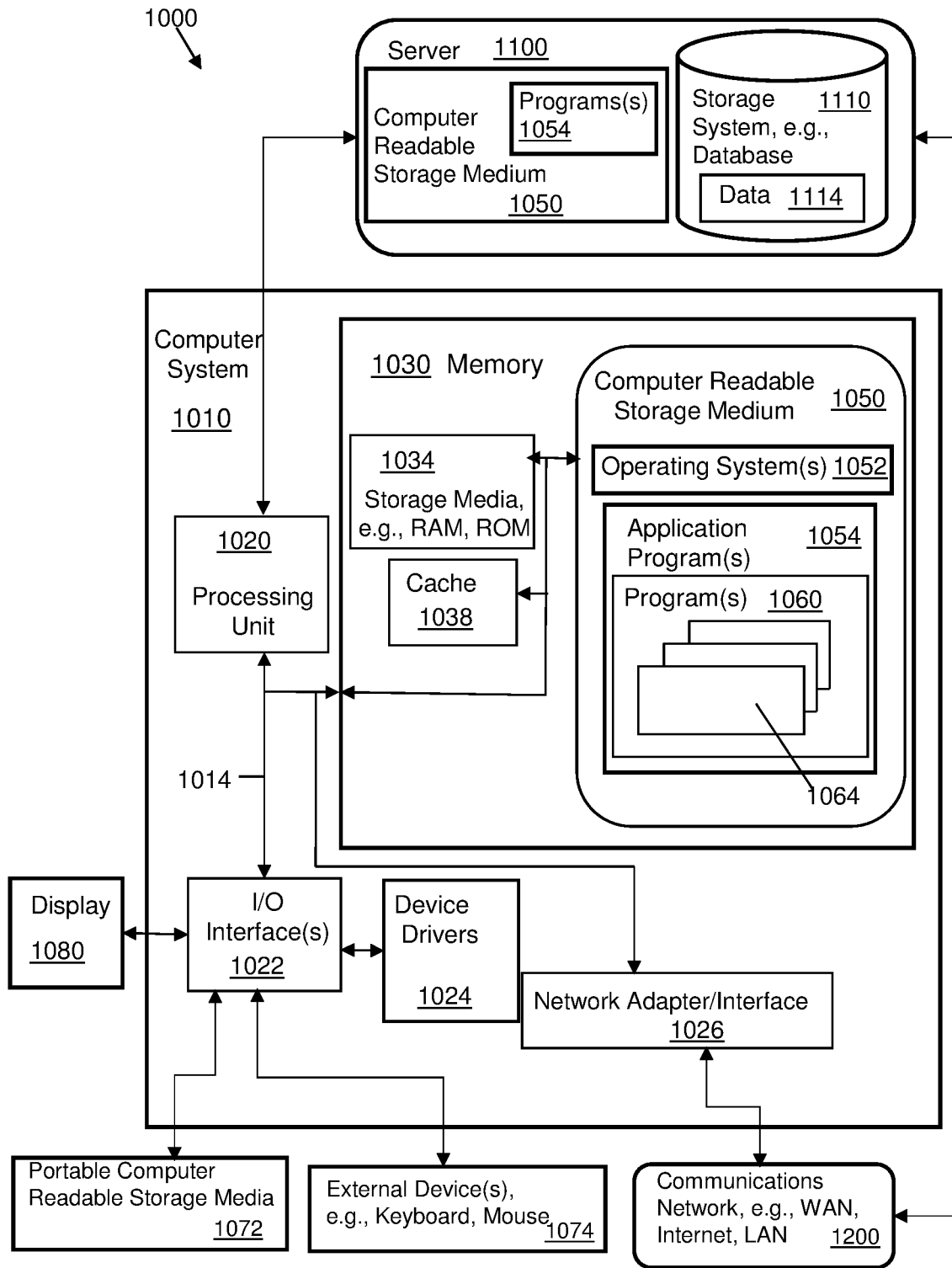
FIG. 14 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 14, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
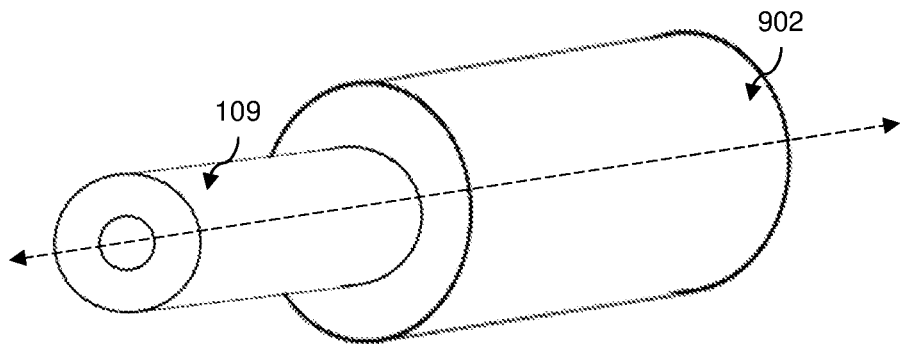
FIG. 9 is an isometric view of portions of an embodiment of a positioning device having an extendable sleeve used in a method to position an object using a computer-controlled, low-contact-force-generating positioning device according to aspects of the invention.
Figure 15:
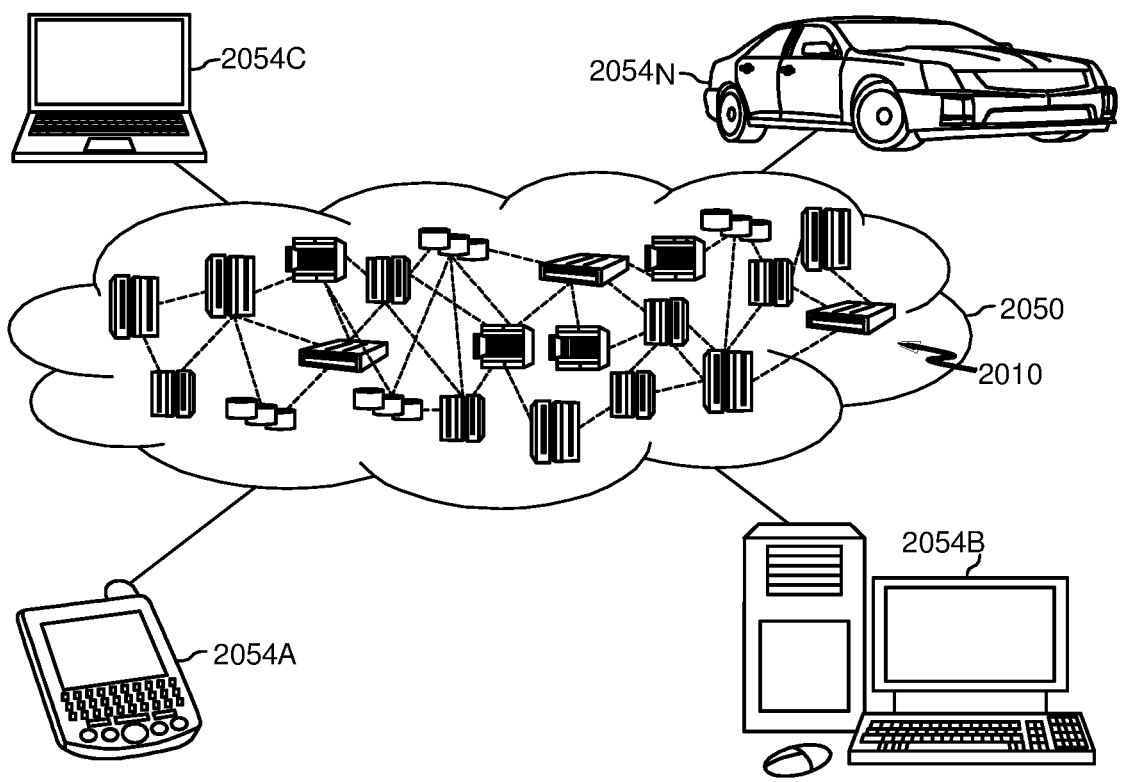
FIG. 15 depicts a cloud computing environment according to an embodiment of the present invention.

Referring now to FIG. 15, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 16:
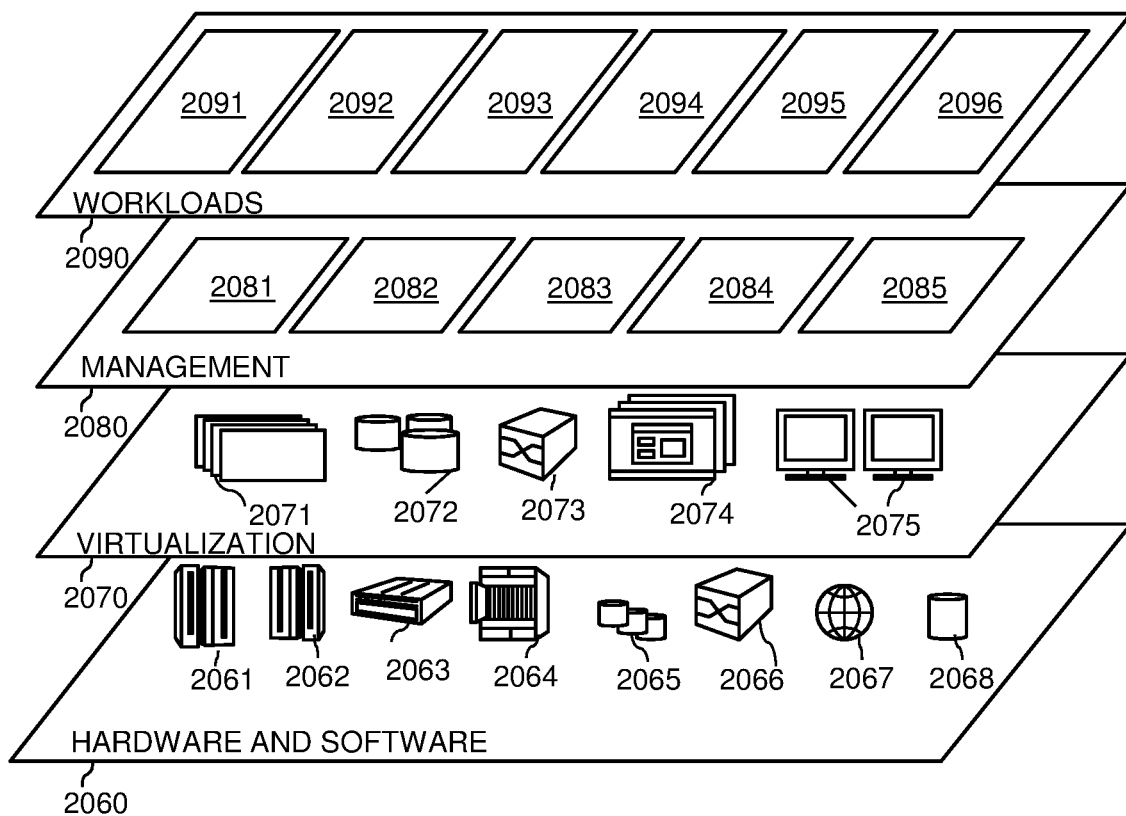
FIG. 16 depicts abstraction model layers according to an embodiment of the present invention.

Referring now to FIG. 16, a set of functional abstraction layers provided by cloud computing environment 2050 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and positioning an object using a computer-controlled, low-contact-force-generating positioning device 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of positioning an object using a computer-controlled positioning device, comprising:
    identifying a computer and a positioning device operatively associated with said computer via a control interface, said positioning device having a hollow interior chamber;
    identifying a selected object located at a primary location within said hollow interior chamber and having a primary orientation with respect thereto;
    identifying a first array of elements constructed and arranged to generate contact- free support forces sufficient to maintain the selected object at said primary location;
    identifying a second array of elements constructed and arranged to provide contact-free interaction forces sufficient to move said selected object within said hollow interior chamber; and
    interacting with said object, by said computer using said interface, to adjust at least one of either said supporting forces and said interaction forces to place said selected object into at least one of a secondary location or a secondary orientation;
    identifying, by said computer, a movable sleeve having a sleeve interior chamber coaxial with said positioning device hollow interior chamber;
    moving, by said computer via said control interface, said movable sleeve into an extended position with respect to said positioning device hollow interior chamber; and
    wherein said at least one of the secondary location or the secondary orientation is within said sleeve interior chamber.

2. The method of claim 1, further including:
    identifying, by said computer, a camera associated with said hollow interior chamber, said camera being adapted and arranged to identify a current location of said selected object relative to at least one positioning reference; and
    wherein said interacting with said object, is conducted at least in part, with reference to signals sent by said camera.

3. The method of claim 1, wherein said support forces are selected from a list consisting of acoustic radiation forces and magnetic forces.

4. The method of claim 1, wherein at least one of said first array of elements and said second array of elements is independently controlled, and wherein said adjustment of said at least one of said supporting forces and said interaction forces is based, at least partially on said independent control.

5. The method of claim 1, further including,
    identifying, by said computer, said positioning device as a sending positioning device and identifying a second positioning device identical to said sending position device as a receiving positioning device; and
    wherein said at least one secondary location or secondary orientation is within said second positioning device.

6. The method of claim 1, further including:
    identifying, by said computer, the selected object as an object for which said computer has a stored group of associated interactions; and wherein said least one of the secondary location or the secondary orientation is identified within said stored group of interactions.

7. A system of positioning an object using a computer-controlled positioning device, which comprises:
    a computer system comprising a computer readable storage medium having program instructions embodied therewith, the program instructions executable by a computer to cause the computer to:
    identify a computer and a positioning device operatively associated with said computer via a control interface, said positioning device having a hollow interior chamber;
    identify a selected object located at a primary location within said hollow interior chamber and having a primary orientation with respect thereto;
    identify a first array of elements constructed and arranged to generate contact-free support forces sufficient to maintain the selected object at said primary location;
    identify a second array of elements constructed and arranged to provide contact-free interaction forces sufficient to move said selected object within said hollow interior chamber; and
    interact with said object, by said computer using said interface, to adjust at least one of either said supporting forces and said interaction forces to place said selected object into at least one of a secondary location or a secondary orientation;

identify a movable sleeve having a sleeve interior chamber coaxial with said positioning device hollow interior chamber;

move via said control interface said sleeve into an extended position with respect to said positioning device hollow interior chamber; and wherein said at least one of the secondary location or the secondary orientation is within said sleeve interior chamber.

8. The system of claim 7, further including:

identifying, by said computer, a camera associated with said hollow interior chamber, said camera being adapted and arranged to identify a current location of said selected object relative to at least one positioning reference; and wherein said interacting with said object, is conducted at least in part, with reference to signals sent by said camera.

9. The system of claim 7, wherein said support forces are selected from a list consisting of acoustic radiation forces and magnetic forces.

10. The system of claim 7, wherein at least one of said first array of elements and said second array of elements is independently controlled, and wherein said adjustment of said at least one of said supporting forces and said interaction forces is based, at least partially on said independent control.

11. The system of claim 7, further including, identify said positioning device as a sending positioning device and identifying a second positioning device identical to said sending position device as a receiving positioning device; and wherein said at least one secondary location or secondary orientation is within said second positioning device.

12. The system of claim 7, further including:

identify the selected object as an object for which said computer has a stored group of associated interactions; and wherein said least one of the secondary location or the secondary orientation is identified within said stored group of interactions.

13. A computer program product to position an object using a computer-controlled positioning device, the computer program product comprising a computer readable storage medium having program instructions embodied therewith, the program instructions executable by a computer to cause the computer to:

identify a computer and a positioning device operatively associated with said computer via a control interface, said positioning device having a hollow interior chamber;

identify, using said computer, a selected object located at a primary location within said interior chamber and having a primary orientation with respect thereto;

identify, using said computer, a first array of elements constructed and arranged to generate contact-free support forces sufficient to maintain the selected object at said primary location;

identify, using said computer, a second array of elements constructed and arranged to provide contact-free interaction forces sufficient to move said selected object within said interior chamber; and interact, using said computer, with said object, by said computer using said interface, to adjust at least one of either said supporting forces and said interaction forces to place said selected object into at least one of a secondary location or a secondary orientation;

identify, using said computer, a movable sleeve having a sleeve interior chamber coaxial with said positioning device interior chamber;

move, using said computer, via said control interface said sleeve into an extended position with respect to said positioning device interior chamber; and wherein said at least one of the secondary location or the secondary orientation is within said sleeve interior chamber.

14. The computer program product of claim 13, further including:

identifying, by said computer, a camera associated with said hollow interior chamber, said camera being adapted and arranged to identify a current location of said selected object relative to at least one positioning reference; and wherein said interacting with said object, is conducted at least in part, with reference to signals sent by said camera.

15. The computer program product of claim 13, wherein said support forces are selected, using said computer, from a list consisting of acoustic radiation forces and magnetic forces.

16. The computer program product of claim 13, wherein at least one of said first array of elements and said second array of elements is independently controlled, using said computer, and wherein said adjustment of said at least one of said supporting forces and said interaction forces is based, at least partially on said independent control.

17. The computer program product of claim 13, further including instructions causing said computer to:

identify, using said computer, said positioning device as a sending positioning device and identifying a second positioning device identical to said sending position device as a receiving positioning device; and wherein said at least one secondary location or secondary orientation is within said second positioning device.

* * * * *